United States Patent [19]

Huet

[11] Patent Number: 5,004,010
[45] Date of Patent: Apr. 2, 1991

[54] HOSE RUPTURE VALVE

[76] Inventor: Wilfred Huet, 1259 Lozanne Crescent, Timmins, Ontario, Canada, P4N 7C4

[21] Appl. No.: 465,948

[22] Filed: Jan. 16, 1990

[30] Foreign Application Priority Data

Sep. 29, 1989 [CA] Canada .................................. 614651

[51] Int. Cl.$^5$ .......................................... F16K 17/24
[52] U.S. Cl. ............................ 137/513.3; 137/515.5; 137/521; 137/527.6
[58] Field of Search ................. 137/513.3, 515.5, 521, 137/527.6

[56] References Cited

U.S. PATENT DOCUMENTS

| | | | |
|---|---|---|---|
| 580,294 | 4/1897 | Stone | 137/521 X |
| 810,746 | 1/1906 | Hadley | 137/521 X |
| 1,039,749 | 10/1912 | Ingram | 137/521 X |
| 1,447,102 | 2/1923 | Rae | 137/521 X |
| 2,761,469 | 9/1956 | Hansen. | |
| 3,144,876 | 8/1964 | Frye | 137/527.6 X |
| 3,380,474 | 4/1968 | Mills | 137/521 X |
| 3,756,272 | 9/1973 | Hammond. | |
| 3,974,857 | 8/1976 | Svensson. | |

FOREIGN PATENT DOCUMENTS 706982  7/1931  France .................. 137/521

*Primary Examiner*—Robert G. Nilson
*Attorney, Agent, or Firm*—Barrigar & Oyen

[57] ABSTRACT

An improved hose rupture valve is disclosed for preventing the excessive and dangerous flow of fluid through a high pressure hose when the hose is ruptured or the pneumatic or hydraulic tool at the end thereof is accidentally decoupled downstream of the valve. The valve comprises a housing containing a cylinder having a pivotally mounted vane. During normal operation, the vane is held in an open position by biasing means such as a spring. When the hose downstream of the valve is ruptured or accidentally decoupled from the pneumatic or hydraulic tool, the pressure within the cylinder suddenly decreases relative to the pressure within the housing and the vane pivots into a closed position to prevent the excessive flow of fluid through the outlet port of the valve.

10 Claims, 2 Drawing Sheets

HOSE RUPTURE VALVE

FIELD OF THE INVENTION

The present invention relates to a hose rupture valve for preventing the excessive flow of a fluid through a high pressure hose when the hose downstream of the valve is ruptured or a pneumatic or hydraulic device at the end thereof is accidentally decoupled from the hose.

BACKGROUND OF THE INVENTION

Pneumatic equipment is commonly used in various fields of industry, particularly in the areas of mining and resource extraction. Typically, pneumatically driven equipment is supplied with compressed air from a pneumatic pump via a long pneumatic hose. From time to time, the pneumatic device may accidentally decouple or break-away from the pneumatic hose. Air rushing through the open end of the hose tends to cause the hose to whip and flail violently. Operators and other personnel working near the rupture point may be physically injured by the flailing pneumatic hose. A hose rupture valve located upstream of the rupture point acts to prevent the flailing of the ruptured hose by stopping the flow of air. To date, however, hose rupture valves have been both expensive to purchase and cumbersome to operate. Several prior hose rupture valves required the pressure source to be shut down and the pneumatic fluid bled away before the hose could be recoupled or repaired and normal operation could begin. Other prior hose rupture valves, while permitting a limited flow of fluid through the valve after the rupture of the hose, were very complicated to build and subsequently expensive to purchase.

Accordingly, it is an object of this invention to provide a new and improved hose rupture valve which is inexpensive to manufacture and simple and reliable to operate.

Accordingly, the present invention provides a new and improved hose rupture valve for use in association with a pneumatic or hydraulic hose which operates to stop the excessive flow of fluid through the hose, wherein said rupture valve comprises a housing having an inlet port and an outlet port, and a spring biased apertured vane which is pivotally mounted towards the outlet port. Upon rupture of the hose downstream of the valve, the sudden difference in pressure created between the interior of the hose just downstream of the outlet port and the interior of the housing causes the vane to pivot towards the outlet port and close off said outlet port. The aperture within the vane permits the equalization of the pressure difference between the inside of the outlet port and the inside of the housing when the hose downstream of the rupture valve is recoupled or repaired. This in turn permits the spring biased vane to return to its open position to permit the normal flow of fluid through the valve.

BRIEF DESCRIPTION OF THE DRAWINGS

The preferred embodiment of the hose rupture valve according to the invention will become more apparent upon consideration of the following description taken in connection with the accompanying drawings wherein.

DETAILED DESCRIPTION OF THE PREFERRED EMBODIMENT

Figure 1:
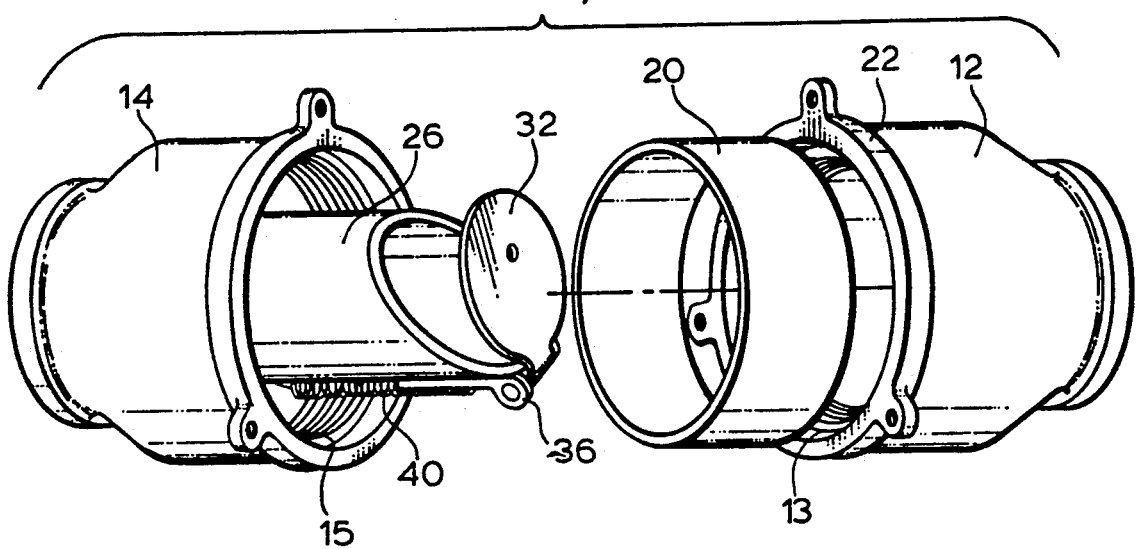
FIG. 1 is a perspective view of a hose rupture valve constructed in accordance with the present invention.

With primary reference to FIG. 1, the preferred embodiment of the present invention shown generally as 10 comprises housing made up of housing members 12, 14 and collar 20, cylinder 26, vane 32 and biasing means 40.

Figure 2:
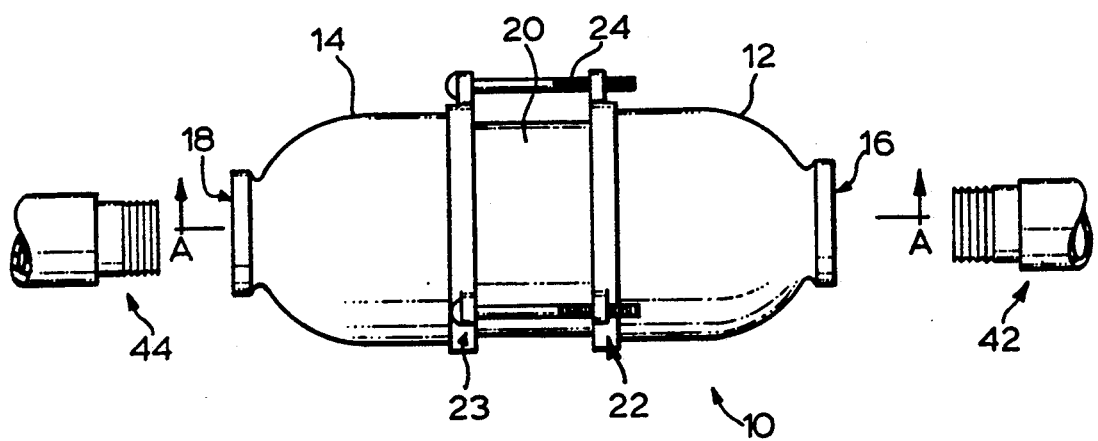
FIG. 2 shows a top plan view of the subject hose rupture valve, shown in its coupled state.
Figure 3:
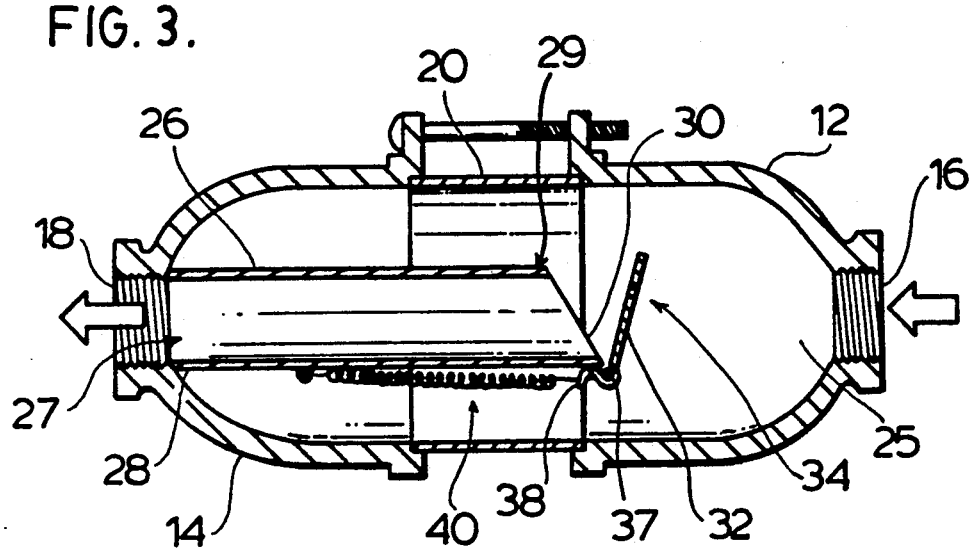
FIG. 3 is a cross-sectional view taken along line A—A of FIG. 1.

Referring now to FIG. 2 and FIG. 3, hose rupture valve 10 is connected downstream of a pneumatic pressure source by connecting pressure hose 42 to inlet port 16. Pressure hose 44 is connected to outlet port 18 at one end and to a pneumatic device downstream of hose rupture valve 10 at its other end. The direction of fluid flow is designated by the arrows in FIG. 3.

Referring now to FIGS. 1 and 2, housing member 12 comprises flange 22 and inlet port 16 provided with female screw threads. Housing member 14 comprises flange 23 and outlet port 18 provided with female screw threads. Collar 20 is axially interposed between housing members 12 and 14, and rests on inside shoulders 13 and 15 of housing members 12 and 14 respectively. Housing members 12 and 14 are urged together by fastening bolts 24 communicating between flanges 22 and 23.

With primary reference to FIGS. 1 and 3, cylinder 26 is a hollow tube contained within the housing. Proximate end 28 of cylinder 26 is sealingly attached to housing member 14 at outlet port 18 such that interior 27 of cylinder 26 is coaxial with outlet port 18. Opening 30 of cylinder 26 extends towards the centre of the housing. The distal or free end 29 of cylinder 20 is truncated at an acute angle such that opening 30 is elliptical in shape. Vane 32 is pivotally attached to the forwardmost extension of cylinder 26 via attachment members 36. Vane 32 is provided with aperture 34 and stop means 38. Biasing means 40 is attached at one end to stop means 38 of vane 32. The other end of biasing means 40 is attached to cylinder 26 towards proximate end 28.

Figure 4:
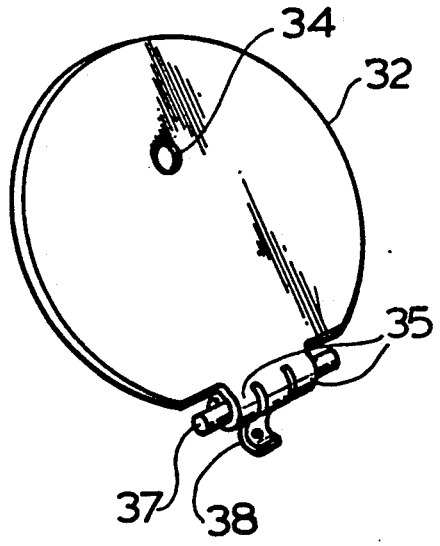
FIG. 4 is a close up perspective view of the vane.

With primary reference to FIGS. 3 and 4, vane 32 is further provided with curved extensions 35 located at either side of stop means 38. Pin 37 is positioned through curved extensions 35 and pivotally attaches vane 32 to attachment members 36. Stop means 38 is positioned relative to the body of vane 32 such that tensile force applied by biasing means 40 positions vane 32 towards its open position. Stop means 38 is configured such that it stops the angular displacement of vane 32 at approximately a 45° angle from opening 30 of cylinder 26 by bearing against the distal end 29 of cylinder 26.

During normal operation, compressed pneumatic fluid travels first through inlet port 16 then within interior 25 of valve 10, then through opening 30, then within interior 27 of cylinder 26, then through outlet port 18 and then finally through hose 44. During normal operating conditions, the pressure within interior 25 of valve 10 is approximately equal to the pressure within interior 27 of cylinder 26. Biasing means 40 serves to hold vane 32 in an open position, being approximatly a 45° angle from opening 30, which in turn permits the free flow of pneumatic fluid from inlet port 16 to outlet port 18. When hose 44 ruptures or the pneumatic device at the end thereof accidentally decouples downstream of valve 10, the pneumatic fluid within hose 44 quickly escapes and the pressure within interior 27 of cylinder 26 decreases rapidly. Due to the sudden increase in the pressure gradient between interior 25 of valve 10 and interior 27 of cylinder 26, a difference of pressure exists across vane 32. This difference in pressure is sufficiently great to overcome the biasing action of biasing means 40, and causes vane 32 to pivot about pin 37 thereby closing off discharge opening 30. Vane 32 is approximately elliptical in shape and closely matches the shape of opening 30 such that when vane 32 is pressed against opening 30 there is a blockage of cylinder 26. As long as hose 44 remains open to atmospheric pressure, the difference in pressure between interior 27 of cylinder 26 and interior 25 of valve 10 is sufficiently great to hold vane 32 tightly against opening 30. Small aperture 34 permits a limited amount of pneumatic fluid to pass from interior 25 of valve 10 to interior 27 of cylinder 26. When hose 44 is repaired or recoupled, this limited flow of pneumatic fluid through aperture 34 eventually results in the repressurization of interior 27 of cylinder 26. When the interior 27 of cylinder 26 is fully pressurized the tensile force applied by biasing means 40 is sufficient to deflect vane 32 into its open position so as to allow the free flow of pneumatic fluid through hose rupture valve 10.

In an alternative embodiment of the present invention the biasing means may comprise a modified vane which is held in an open position by the force of gravity. In this alternative embodiment, the valve is kept in a fixed position such that the vane hangs down in an open position.

In another alternative embodiment of the present invention, the housing is formed without a collar by two longer housing members which are urged together by fastening bolts. It is also possible to urge together the housing members by some alternative fastening means such as welds.

In another embodiment of the present invention, the distal end of the cylinder may be truncated at approximately 90° from the axis of the cylinder, while in yet another embodiment, the valve may be pivotally attached directly to the inside of the housing member at a point directly in front of the outlet port.

In yet another embodiment of the invention, the hose rupture valve may be used with pressure hoses carrying a hydraulic fluid such as oil or water.

It will thus be apparent to those skilled in the art that while the subject invention as been described and illustrated with respect to various preferred and alternative embodiments, various modifications of these embodiments may be made without departing from the subject invention, the scope of which is defined in the appended claims.

I claim:

1. A hose rupture valve, comprising:
   (a) a housing having a longitudinal bore, an inlet port at one end of said housing, and an outlet port at the other end thereof, said ports being adapted so as to be coupled to high pressure fluid hoses;
   (b) a vane pivotally mounted within the housing, said vane pivotally moving between an open position allowing flow of fluid through the housing and a closed position sealing off the outlet port when the hose downstream of the outlet port is opened to atmospheric pressure; and
   (c) a cylindrical conduit mounted within the housing along the longitudinal axis thereof, said conduit having a proximate end sealingly attached to the outlet port, a bore coaxial with the outlet port, and a distal end through which fluid passing through the valve may flow, the distal end of which is truncated at an acute angle, said vane being pivotally mounted to the forward most extension of the conduit.

2. A hose rupture valve defined in claim 1, further comprising biasing means for biasing said vane into an open position allowing fluid to pass into outlet port during ordinary operating conditions.

3. The hose rupture valve as defined in claim 1, further comprising stop means for stopping the pivotal motion of the vane when the vale is at a preselected angle from the forward most extension of the conduit.

4. A hose rupture valve as defined in claim 3, wherein the stop means comprises an integral extension of the vane shaped to bear against the outside side wall of the conduit when the vane swings open to said preselected angle.

5. The hose rupture valve as defined in claim 1, wherein the vane is apertured to permit a limited flow of fluid from the interior of the housing to the outlet port when the vane is in its closed position.

6. The hose rupture valve as defined in claim 1, wherein the vane in its open position is at approximately a 45° angle from the outlet port.

7. The hose rupture valve as defined in claim 1, wherein the biasing means comprises a spring, said spring being attached at one end to the vane, and the other end of said spring being attached to the conduit.

8. The hose rupture valve as defined in claim 1, wherein the housing comprises two hollow members urged together by fasteners.

9. The hose rupture valve as defined in claim 1, wherein the high pressure fluid hoses carry pneumatic fluid.

10. A hose rupture valve comprising:
   a housing having a longitudinal bore, an inlet port at one end of said housing and an outlet port at the other end thereof, said ports being adapted so as to be coupled to high pressure hoses;
   a cylindrical conduit mounted within the housing along the longitudinal axis thereof, said conduit being sealingly attached to the outlet port at one end thereof, said conduit having a bore coaxial with the outlet port, and a distal end having an opening through which fluid passing the valve may flow said distal end being truncated at an acute angle;
   a vane pivotally mounted to the distal end of the conduit at the forward most extension thereof, said vane pivotally moving between an open position allowing for the flow of fluid through the conduit and a closed position closing off the distal end of the conduit when there occurs a sudden drop in pressure between the fluid contained within the housing and the fluid contained within the conduit caused by the hose downstream of the valve being opened to atmospheric pressure, wherein said vane being apertured to permit a limited flow of fluid through the valve when the vane is in its closed position;
   biasing means for biasing said vane into an open position during normal operating conditions; and
   stop means for stopping the pivotal motion of the vane when the vane is at a preselected angle from the forward most extension of the conduit.

* * * * *